US005645057A

United States Patent [19]

Watt et al.

[11] Patent Number: 5,645,057

[45] Date of Patent: Jul. 8, 1997

[54] MELTBLOWN BARRIER WEBS AND PROCESSES OF MAKING SAME

[75] Inventors: James M. Watt, Piedmont; Deborah K. Lickfield, Easley, both of S.C.

[73] Assignee: Fiberweb North America, Inc., Simpsonville, S.C.

[21] Appl. No.: 677,443

[22] Filed: Jul. 2, 1996

Related U.S. Application Data

[62] Division of Ser. No. 475,949, Jun. 7, 1995, Pat. No. 5,620,785.

[51] Int. Cl.[6] .......................... A62B 23/00; A62B 23/06; B32B 5/26; B32B 5/32

[52] U.S. Cl. ................ 128/206.12; 55/528; 55/DIG. 39; 156/62.4; 156/167; 156/176; 156/308.2; 264/DIG. 48; 428/315.5; 428/315.9; 428/903; 442/346; 442/381; 442/382

[58] Field of Search ................................ 428/286, 315.5, 428/315.9, 903; 156/62, 4, 167, 308.2, 176; 128/206.12; 264/DIG. 48; 55/DIG. 39, 528

[56] References Cited

U.S. PATENT DOCUMENTS

| | | | |
|---|---|---|---|
| 4,011,167 | 3/1977 | Carey et al. . | |
| 4,041,203 | 8/1977 | Brack et al. . | |
| 4,215,682 | 8/1980 | Kubik et al. . | |
| 4,375,718 | 3/1983 | Wadsworek et al. . | |
| 4,419,993 | 12/1983 | Petersen . | |
| 4,536,440 | 8/1985 | Berg . | |
| 4,588,537 | 5/1986 | Klaase et al. . | |
| 4,608,173 | 8/1986 | Watanabe et al. . | |
| 4,662,005 | 5/1987 | Grier-Idris . | |
| 4,807,619 | 2/1989 | Dyrud et al. . | |
| 4,813,948 | 3/1989 | Insley . | |
| 4,863,785 | 9/1989 | Berman et al. . | |
| 4,874,399 | 10/1989 | Reed et al. . | |
| 4,874,659 | 10/1989 | Ando et al. . | |
| 4,920,960 | 5/1990 | Hubbard et al. . | |
| 4,921,645 | 5/1990 | Insley . | |
| 4,969,457 | 11/1990 | Hubbard et al. . | |
| 5,122,048 | 6/1992 | Deeds . | |
| 5,149,468 | 9/1992 | Hershelman . | |
| 5,150,703 | 9/1992 | Hubbard et al. . | |
| 5,254,297 | 10/1993 | Deeds . | |
| 5,306,534 | 4/1994 | Bosses . | |
| 5,307,796 | 5/1994 | Kronyer et al. . | |
| 5,322,061 | 6/1994 | Brunson . | |
| 5,409,766 | 4/1995 | Yuasu et al. | 428/903 |
| 5,436,066 | 7/1995 | Chen | 428/903 |
| 5,482,765 | 1/1996 | Bradley et al. | 428/286 |
| 5,486,411 | 1/1996 | Hassenbochler et al. | 428/286 |

*Primary Examiner*—James C. Cannon
*Attorney, Agent, or Firm*—Bell, Seltzer, Park & Gibson, P.A.

[57] ABSTRACT

A nonwoven disposable face mask includes a filtration layer formed of a plurality of thermoplastic microfine meltblown microfibers having an average fiber diameter of less than 1.5 microns. The filtration layer also has a basis weight of less than ten grams per square meter. The resultant face mask provides improved wearer comfort and barrier and filtration properties.

29 Claims, 1 Drawing Sheet

MELTBLOWN BARRIER WEBS AND PROCESSES OF MAKING SAME

This application is a divisional of application Ser. No. 08/475,949, filed Jun. 7, 1995, now U.S. Pat. No. 5,620,785.

FIELD OF THE INVENTION

This invention is related to nonwoven fabrics and particularly to nonwoven fabrics having barrier properties which are useful as a component in disposable medical products.

BACKGROUND OF THE INVENTION

Nonwoven fabrics and fabric laminates are widely used in a variety of applications, for example, as components of absorbent products such as disposable diapers, adult incontinence pads, and sanitary napkins; in medical applications such as surgical gowns, surgical drapes, sterilization wraps, and surgical face masks; and in other numerous applications such as disposable wipes, industrial garments, house wrap, carpets and filtration media.

By combining two or more nonwoven fabrics of different types, nonwoven fabric laminates have been developed for a variety of specific end use applications. For example, nonwoven fabric laminates have been developed to serve as a barrier to penetration by air borne contaminants, such as microorganisms. Barrier fabric laminates of this type typically include one or more microfibrous polymer layers, such as meltblown webs, combined with one or more layers of another type of nonwoven fabric.

For example, filtration face masks, well known in the medical and respiratory art, typically include as a component thereof a microfibrous barrier layer. Such face masks can be worn over the breathing passages of a person and typically serve at least one of two purposes: (1) to prevent impurities or contaminants from entering the wearer's breathing tract; and (2) to protect others from being exposed to bacteria and other contaminants exhaled by the wearer. In the first situation, the mask could be worn in an environment were the air contains particulates harmful to the wearer. In the second situation, the mask could be worn in an operating room to protect a patient from infection.

Meltblown nonwoven fabrics can display excellent liquid, gas and particulate filtration properties. and accordingly, have been included in fibrous filtration face masks as barrier layers. Advantageously, the meltblown web provides good barrier properties when incorporated in the mask without adversely impacting the comfort of the wearer of the mask, i.e., the breathability of the mask. as measured by the drop in pressure across the fabric ($\Delta P$). Typically. the meltblown component includes microfibers having an average diameter ranging from about 1.8 to 3 microns. and higher, and has a basis weight ranging from about 20 to 40 grams per square meter. In addition, typically, meltblown webs used in face mask applications exhibit a drop in pressure across the fabric of about 2.0 to 3.0 millimeters of water in the meltblown web. Industry standards typically require a pressure drop of 1.5 to 2.0 in the filtration media, and 2.0 to 4.0 in the finished mask. A variety of face mask constructions are described in U.S. Pat. Nos. 4,920,960, 4,969,457. and 5,150,703, all to Hubbard et al.; U.S. Pat. No. 5,322,061 to Brunson; U.S. Pat. No. 4,807,619 to Dyrud et al.; U.S. Pat. No. 5,307,796 to Kronzer et al; U.S. Pat. No. 4,419,993 to Petersen; U.S. Pat. No. 4,662,005 to Grier-Idris; and U.S. Pat. No. 4,536,440 to Berg.

Despite these and other filtration media and face masks incorporating the same which are currently available, there exists a need to improve important filtration parameters, such as filtration efficiency and wearer comfort and breathability. In addition, it would be advantageous to provide filtration media having a light basis weight, which could also increase wearer comfort. However, increasing filtration efficiency can impair comfort and breathability.

SUMMARY OF THE INVENTION

The present invention provides nonwoven meltblown webs which are useful as filtration media in a laminate fabric, such as a fabrics used to form disposable medical products, and in particular disposable nonwoven face masks. The present invention also provides processes for forming the meltblown webs of the invention, as well as disposable face masks which incorporate the meltblown webs as a component thereof and processes for making the face masks.

The nonwoven meltblown webs of the invention include a plurality of thermoplastic microfine meltblown fibers having an average fiber diameter of less than 1.5 microns, preferably between 0.5 and 1.5 microns, and more preferably between 0.8 and 1.3 microns. In addition, the nonwoven webs of the invention have a basis weight of less than 10 grams per square meter, and preferably between 1 and 5 grams per square meter.

The resultant nonwoven webs exhibit a variety of desirable properties. The very small average diameter of the microfine fibers of the webs can provide improved filtration and barrier properties. Yet despite the decreased fiber size and resultant improved barrier properties, the webs of the invention can be incorporated into a face mask without significantly impairing or diminishing the comfort of the mask to the wearer. For example, the webs are breathable, preferably exhibiting a pressure drop across the web of 0.3 to 0.8. In contrast, conventional meltblown webs used as filtration media have an average fiber diameter of 1.8 to 3 microns and higher, a basis weight from 20 to 40 grams per square meter, and a pressure drop across the web of 2.0 to 3.0.

The meltblown webs of the present invention can be formed of a thermoplastic polymer having a much higher melt flow rate (MFR) than that of polymers conventionally used in meltblowing processes for producing microfine meltblown webs. Conventional meltblown webs are formed of polymers having a MFR of about 800 or lower. The thermoplastic microfine fibers of the meltblown webs of the invention, in contrast, can be formed of a polymer having a melt flow rate of greater than 1,000, and preferably greater than 1,200.

The processing conditions are selected to form the meltblown webs of the invention without concurrently forming substantial amounts of loose fibers, i.e., fly, which can interfere with processing efficiency and cause defects in the meltblown web. It has been found that relatively high MFR thermoplastic polymers, i.e., 1000 MFR or higher, can be attenuated in a heated high velocity air stream in such a way that the process conditions are suitable for the stable production of microfine microfibers and concurrent formation of low basis weight webs. These conditions include controlling the polymer attenuation conditions (e.g. attenuation air velocity and temperature) to promote formation of microfine microfibers and low basis weight webs without significantly impairing or adversely impacting the process conditions, i.e., formation of fly.

Specifically, these parameters, i.e., attenuation gas velocity and temperature, contrary to conventional wisdom, can be increased by up to ten percent and even up to twenty-five percent, as compared to rates typically used for a particular polymer system. Despite the increased attenuation air velocities and temperatures of the processes of the invention, however, substantial amounts of fly are not formed.

BRIEF DESCRIPTION OF THE DRAWINGS

Some of features and advantages of the invention having been stated, others will become apparent from the detailed description which follows, and the accompanying drawings which form a part of the original disclosure of this invention, and in which.

DETAILED DESCRIPTION OF THE INVENTION

The present invention will now be described more fully hereinafter with reference to the accompanying drawings, in which illustrative embodiments of the invention are shown. This invention may, however, be embodied in many different forms and should not be construed as limited to the embodiments set forth herein. Rather, this embodiment is provided so that the disclosure will be thorough and complete, and will fully convey the scope of the invention to those skilled in the art. Like numbers refer to like elements throughout. For purposes of clarity, the scale has been exaggerated.

Figure 1:
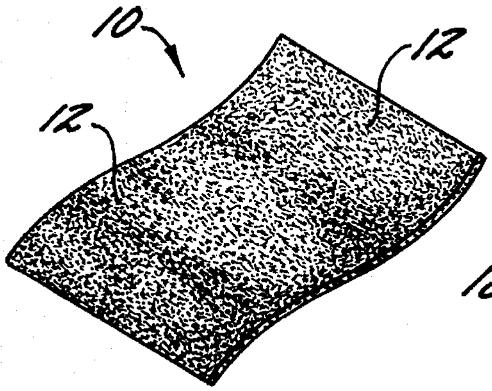
FIG. 1 is a fragmentary top plan view of a meltblown web in accordance with the present invention.

FIG. 1 is a fragmentary top plan view of a meltblown web of the present invention, designated generally as 10. Specifically, meltblown web 10 is a nonwoven web comprising a plurality of thermoplastic microfine fibers 12. The microfine fibers of meltblown web 10 have an average fiber diameter of less than 1.5 microns, preferably an average fiber diameter from 0.5 and 1.5 microns, and more preferably from 0.8 to 1.3 microns. In addition, the basis weight of meltblown web 10 is less than 10 grams per square meter ("gsm"), and preferably between 1 and 5 grams per square meter.

Meltblown web 10 of the invention exhibits a variety of desirable characteristics which make the web particularly useful as a barrier component in a laminate fabric, such as a face mask. Because the microfibers of the web have extremely small fiber diameters, the surface area of the meltblown microfibers is greatly increased, as compared to conventional microfibers. In contrast, conventional meltblown webs incorporated as a component in a face mask include microfine fibers having an average fiber diameter of about 1.8 to 3.0 microns.

Further, by incorporating microfine fibers having an average fiber diameter of less than 1.5 microns, the resultant meltblown web allows a packing density which, combined with the high surface area provided by the microfine fibers, provides significantly improved barrier properties of the fabric.

The basis weight of the meltblown web of the invention is greatly reduced, i.e. to less than 10 gsm, and preferably between 1 and 5 gsm. In contrast, the basis weight of conventional meltblown webs used in filtration applications typically have a basis weight from 20 to 40 gsm. Because of the excellent barrier properties provided by the very small diameter meltblown microfibers of the meltblown webs of the invention, the meltblown webs can have greatly reduced basis weights and still provide excellent barrier properties. For example, filtration efficiency can be as high as 98% BFE, and up to 99% BFE and higher, as explained below, despite the reduced basis weight of the webs of the invention. As a result, meltblown web 10 can provide improved wearer comfort because of the light basis weight, without significantly impairing or diminishing the barrier properties of the web, for example, against passage of airborne contaminants and bacteria.

Accordingly, the combination of the microfine fiber size and low basis weight of the web results in a filtration media with excellent barrier properties but does not significantly obstruct the free passage of air, thus providing good wearer comfort.

The high breathability feature of meltblown web 10 of the present invention makes the meltblown web a superior candidate as a component for a face mask, where barrier and ultra-high breathability are required but can be poorly delivered by existing commercial products. Functionally, this translates into wearer comfort in a face mask. One important predictor of wearer comfort is a measurement of the change in pressure across the fabric, referred to as "Delta P" ("ΔP"). This value measures the drop in pressure in millimeters ("mm") of water across the fabric at a constant flow rate (85 liters per minute) of air through a 100 square centimeter area of the web. A low differential in pressure across the mask is desirable for breathability.

Current industry standards permit a ΔP range of 2.0 to 4.0 millimeters (mm) water in a finished mask, and a ΔP range of 1.5 to 2.0 in a meltblown media to be incorporated in a face mask. Standard 20 to 40 gram per square meter meltblown webs having an average fiber diameter of 1.8 to 3.0 microns typically have a ΔP range of 2.0 to 3.0. In contrast, the meltblown webs of the present invention have a ΔP in the range of 0.3 to 0.8. Accordingly, masks incorporating the meltblown webs of the invention exhibit a sufficiently low pressure drop across the mask so that the wearer can breathe comfortably. Thus the meltblown webs of the present invention can optimize filtration properties of a mask incorporating the web to resist the passage of particles therethrough while minimizing the resistance to normal breathing of the wearer of the mask.

The microfibers 12 of meltblown web 10 can be formed using any of various thermoplastic fiber forming materials known to the skilled artisan. Such materials include polyolefins such as polypropylene and polyethylene, polyesters such as poly(ethylene terephthalate), polyamides, polyacrylates, polystyrene, thermoplastic elastomers, and blends of these and other known fiber forming thermoplastic materials. The polymer selected preferably has a relatively high melt flow rate, as compared to conventional polymers used in meltblowing processes, as explained in more detail below. In a preferred embodiment, meltblown web 10 is a nonwoven web of polypropylene meltblown microfibers Advantageously, meltblown web 10 is electrically treated to improve filtration properties of the web. Such electrically treated fibers are known generally in the art as "electret" fibrous webs. Electret fibrous filters are highly efficient in filtering air because of the combination of mechanical entrapment of particles in the air with the trapping of particles based on the electrical or electrostatic characteristics of the fibers. Both charged and uncharged particles in the air, of a size that would not be mechanically trapped by the filtration medium, will be trapped by the charged nature of the filtration medium. Meltblown web 10 can be electrically treated using techniques and apparatus know in the art.

Figure 2:
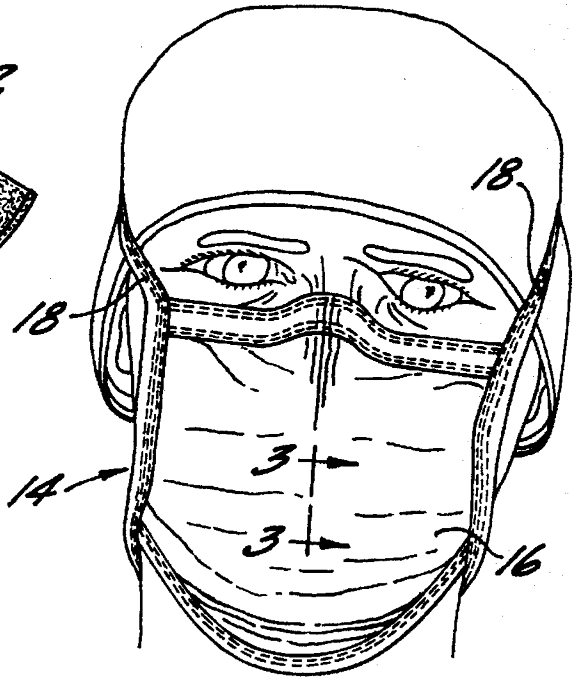
FIG. 2 is a perspective view of a face mask in accordance with the present invention incorporating as a component thereof the meltblown web of FIG. 1.

The meltblown webs of the fabric can be included as a component of a face mask of a type known in the art. Referring now to FIG. 2, a perspective view of such a face mask 14 having a mask body 16 is illustrated.

Face mask 14 incorporates as a component thereof meltblown web 10 of the invention, as well as other layers combined therewith to provide desired end product characteristics. In addition, face mask 14 includes means 18 for removably attaching and holding mask 14 to the face of a wearer. Mask attaching means 18 is illustrated in FIG. 2 as strips of fabric attached to mask body 16. However, as will be appreciated by the skilled artisan, mask attaching means 18 can be any of the types of devices known in the art for removably attaching and holding a mask to a wearer's face, such as elastic bands, strips of nonwoven or woven fabrics, and the like. Mask attaching means 18 can be attached to mask body 18 by thermal bonding, stapling, gluing, sewing, and the like.

Figure 3:
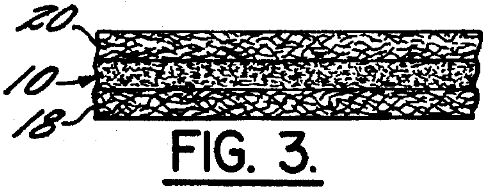
FIG. 3 is a cross sectional view of the face mask of FIG. 2 taken along lines 3—3.

FIG. 3 illustrates a cross sectional view taken along line 3—3 of face mask 14 of FIG. 2. FIG. 3 illustrates that mask 14 includes a plurality of layers, each providing desired characteristics to the mask as a whole. For example, in the present invention, meltblown web 10 is incorporated as the central layer to serve as a barrier component for the mask 14. Mask 14 can include one or more barrier webs, and can include one or more meltblown webs 10 of the invention. Advantageously the (ΔP) across the mask is from 0.5 to 3.0, and preferably from 0.5 to 1.5.

In addition, mask 14 includes at least two opposing outer layers 18 and 20 which sandwich meltblown web be to form the laminate mask body Layers 10, 18 and 20 are bonded together to form a coherent fabric using techniques and apparatus known in the art. For example, layers 10, 18 and 20 can be bonded together by thermal bonding, mechanical interlocking, adhesive bonding, and the like. Preferably, mask body 16 includes a plurality of thermal bonds about the periphery thereof, bonding layers 10, 18 and 20 together.

Advantageously, layer 18 is an inner absorbent layer which will be adjacent the face of the wearer of the mask. The absorbent nature of nonwoven web 18 is advantageous because perspiration and the like on the surface of the skin of the wearer of the mask will be absorbed, thus providing comfort to the wearer. Any of the types of webs used in the art for providing an inner layer facing the skin of the wearer of the mask can be used. For example, inner absorbent layer 18 can be a hydrophilic nonwoven web, such as a web comprising absorbent staple fibers, i.e., a carded web, a wet-laid web, a dry-laid web, and the like. Alternatively, absorbent layer 18 can include a plurality of spunbonded thermoplastic substantially continuous filaments.

Preferably, absorbent layer 18 comprises a mixture of thermoplastic staple fibers and absorbent staple fibers. The thermoplastic fibers are preferably staple fibers made from any of the various well known thermoplastics and include polyolefin fibers, polyester fibers, polyamide fibers, polyacrylate fibers, polystyrene fibers, and copolymers and blends of these and other known fiber forming thermoplastic materials. In one embodiment of the invention, the staple fibers employed can be sheath-core or similar bicomponent fibers wherein at least one component of the fiber is polyethylene. Exemplary bicomponent fibers include polyolefin/polyester sheath-core fibers, such as a polyethylene/polyethylene terephthalate sheath-core fiber.

The absorbent fibers can be cotton fibers, wool fibers, rayon fibers, wood fibers, acrylic fibers, and the like. The hydrophilic nonwoven web can include absorbent fibers in an amount sufficient to impart absorbency characteristics to the web.

Layer 20 advantageously can be an outer cover layer for providing liquid and gas permeability protection as well as providing structural integrity and abrasion resistance to the mask. Layer 20 can be any of the types of materials known in the art for providing a cover sheet in a face mask. For example, layer 20 can be a nonwoven web comprising thermoplastic staple fibers as described above; alternatively, layer 20 can be a nonwoven web formed of substantially continuous spunbonded filaments. Preferably, web 20 is hydrophobic, and provides an initial barrier protection against the passage of liquids and airborne contaminants. The thermoplastic polymer used to make layer 20 can be any of the various fiber forming polymers used to make hydrophobic fibers and includes polyolefins, polyesters, polyamides and blends and copolymers of these and other known fiber forming thermoplastic hydrophobic materials. Layer 20 can also include cellulosic fibers, such as wood pulp, rayon, cotton, and the like. Preferably, cover layer 20 is chemically coated or treated, for example, by spraying with a liquid repellant, to render the cover layer 20 resistant to penetration by liquids.

In addition, as will be appreciated by the skilled artisan, face mask 14 can include one or more additional layers to provide improved barriers to transmission of liquids, airborne contaminants, etc.

Figure 4:
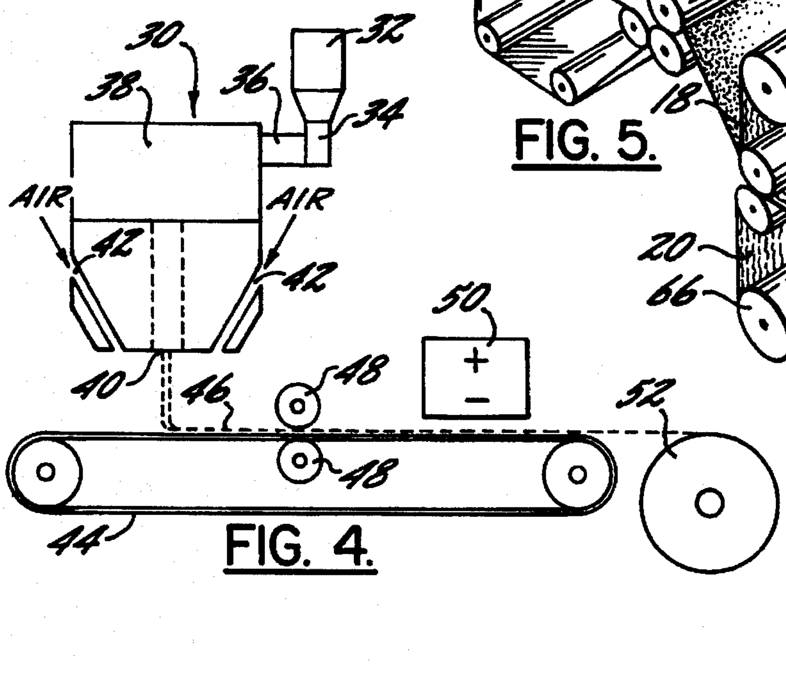
FIG. 4 is a schematic side view of an illustrative process in accordance with the present invention for forming the meltblown web of FIG. 1.

Referring now to FIG. 4, an illustrative process for forming the meltblown web 10 of the present invention is illustrated. FIG. 4 is a simplified, diagrammatic illustration of an apparatus, designated generally as 30, capable of carrying out the method of forming a meltblown web in accordance with the invention. Conventional meltblowing apparatus known in the art can be used.

In meltblowing, thermoplastic resin is fed into an extruder where it is melted and heated to the appropriate temperature required for fiber formation. The extruder feeds the molten resin to a special meltblowing die. The die arrangement is generally a plurality of linearally arranged small diameter capillaries. The resin emerges from the die orifices as molten threads or streams into high velocity converging streams of heated gas, usually air. The air attenuates the polymer streams and breaks the attenuated streams into a blast of fine fibers which are collected on a moving screen placed in front of the blast. As the fibers land on the screen, they entangle to form a cohesive web.

The technique of meltblowing is known in the art and is discussed in various patents, e.g., Buntin et al, U.S. Pat. No. 3,978,185; Buntin, U.S. Pat. No. 3,972,759; and McAmish et al, U.S. Pat. No. 4,622,259.

In the present invention, process parameters of the meltblowing process are selected and controlled to form the microfine microfibers of the meltblown webs of the invention while minimizing or eliminating processing complications, i.e., without concurrently forming substantial amounts of loose fibers, i.e., fly, which can interfere with processing efficiency and cause defects in the meltblown web.

It has been found that relatively high MFR thermoplastic polymers, i.e., 1000 MFR or higher, can be attenuated in a heated high velocity air stream in such a way that the process conditions are suitable for the stable production of microfine microfibers and concurrent formation of low basis weight webs. These conditions include controlling the attenuation conditions (e.g. attenuation gas velocity and temperature), as well as selecting an appropriate MFR polymer, to promote formation of microfine microfibers and low basis weight webs without significantly impairing or adversely impacting the process conditions, i.e., formation of fly.

As will be appreciated by the skilled artisan, as the temperature and velocity of the attenuation gas increases, collection of the fibers becomes more difficult. Indeed, elevated temperatures and increased attenuation gas velocities can result in the formation of fibers too short to be collected on the collection surface. For example, conventionally, to form microfibrous meltblown polypropylene webs which can be incorporated as a filtration media in a nonwoven laminate fabric, attenuation process conditions are adjusted so that attenuation gas temperatures are from 515° F. (268° C.) to 525° C. (274° C.). Further, attenuation gas velocities conventionally are about 20 cubic feet per minute ("cfm") per inch of the width of the die.

If the temperature and velocity of the gas is increased beyond these ranges, fibers which are too short to be collected can be formed, known as "fly." These stray fibers tend to float in the air in the area surrounding the meltblowing equipment, and can land on the formed web, thus creating a defect in the fabric. Further, elevated temperatures and gas velocities can result in the formation of "shot" or globules of solid polymer in the web.

In the present invention, the inventors have found that despite conventional wisdom regarding the use of elevated temperatures and increased velocities of the attenuation gas, these process parameters can be increased up to 10 percent, and up to 25 percent and higher, relative to conventional processing parameters for a given polymer system without forming undesirable amounts of fly to form microfibers having a greatly reduced average diameter size as compared to conventional meltblown webs.

The increases in processing parameters are further adjusted in accordance with the characteristics of the particular polymer system being processed. That is, polymers having high melt flow rates relative to conventional meltblowing polymers can be processed to form the meltblown webs described above by increasing attenuation gas velocity and temperature. Typically, meltblown webs are formed from polymers having a melt flow rate of about 800 or lower, believed necessary for cohesiveness and strength. Polymers having melt flow rates higher than about 1000 were believed to be too viscous for smooth attenuation. However, the inventors have found that polymers having a melt flow rate up to 1000, and even up to and greater than 1200 can be meltblown at increased attenuation air temperatures and velocities. The melt flow rate is determined according to ASTM test procedure D-1238 and refers to the amount of polymer (in grams) which can be extruded through an orifice of a prescribed diameter under a mass of 2.16 kg at 230° C. in 10 minutes. The MFR values as used herein have units of g/10 min. or dg/min.

As the melt flow rate of the polymer increases, for example to levels above 2000, and greater, the attenuation gas velocity and temperature do not necessarily have to increase as much as with polymers having a melt flow rate range from about 1000 to 1200 to achieve the same end product. Accordingly, all of these factors, i.e., the attenuation gas velocity and temperature, as well as the polymer system used (i.e., the type of polymer, MFR, melt temperature, etc.) are taken into account when determining the process parameters for a particular polymer used to form the meltblown webs of the invention.

For example, to form polypropylene meltblown microfibers, the temperature of the attenuation gas can be increased to at least about 565° F. (295° C.) to 575° F. (300° C.), and even up to about 645° F. (335° C.) to 655° F. (340° C.). As will be appreciated by the skilled artisan, the temperature of the attenuation gas can vary according the particular polymer system used. For example, to form a polyester meltblown web of the invention, attenuation air temperatures could range from about 580° F. to about 660° F., in contrast to conventional temperatures used of about 540° F. to about 600° F.

In addition, the speed of the attenuation gas can be increased to at least about 25 cfm per inch of the width of the meltblowing die and up to about 30 cfm, and higher. As the skilled artisan will also appreciate, attenuation gas velocities can be dependent upon the configuration of the meltblowing apparatus. For example, as the distance from the orifice through which the attenuation gas exits to the orifice through which the polymer is extruded increases, for attenuation gas streams supplied at equal velocities, a greater volume of gas will be pushed through the gas supplying nozzles, thus in effect increasing the gas velocity.

Referring again to FIG. 4, as shown, thermoplastic polymer pellets of a polymer are placed in a feed hopper 32 of a screw extruder 34 where they are heated to a temperature sufficient to melt the polymer. Advantageously the polymer has a MFR of at least 1000. Alternatively, as will be appreciated by the skilled artisan, the polymer can have a MFR of less than 1000. In this embodiment, visbreaking agents as known in the art, such as peroxide agents, are added to the polymer. The visbreaking agent acts to degrade the polymer so that the polymer extruded has a MFR of at least 1000.

The molten polymer is forced by the screw through conduit 36 into a spinning block 38 and the polymer is extruded from the spin block 38 through a plurality of small diameter capillaries 40 into a high velocity gas stream, such as compressed air designated generally as 42. The temperature and velocity of the air is controlled as described above to form microfine meltblown microfibers having an average fiber diameter of less than about 1.5 microns.

The meltblown microfibers are deposited onto a foraminous endless belt 44 and form a coherent web 46. The web can be passed through a pair of consolidation rolls 48, which optionally may include bonding elements (not shown) in the form of a relief pattern to provide a desired extent of point bonding of the microfibrous web. At these points where heat and pressure is applied, the fibers fuse together, resulting in strengthening of the web structure.

The microfibrous web 46 can then be electrically treated as indicated at 50 to impart an electrical charge to the fabric, and thus improve its filtration capabilities. Techniques and apparatus for electrically treating a nonwoven web are known in the art.

The microfibrous web can then be removed from the assembly and stored on roll 52. Alternatively, the microfibrous web can be passed on to additional manufacturing processes, as described in more detail below, with regard to FIG. 5.

Figure 5:
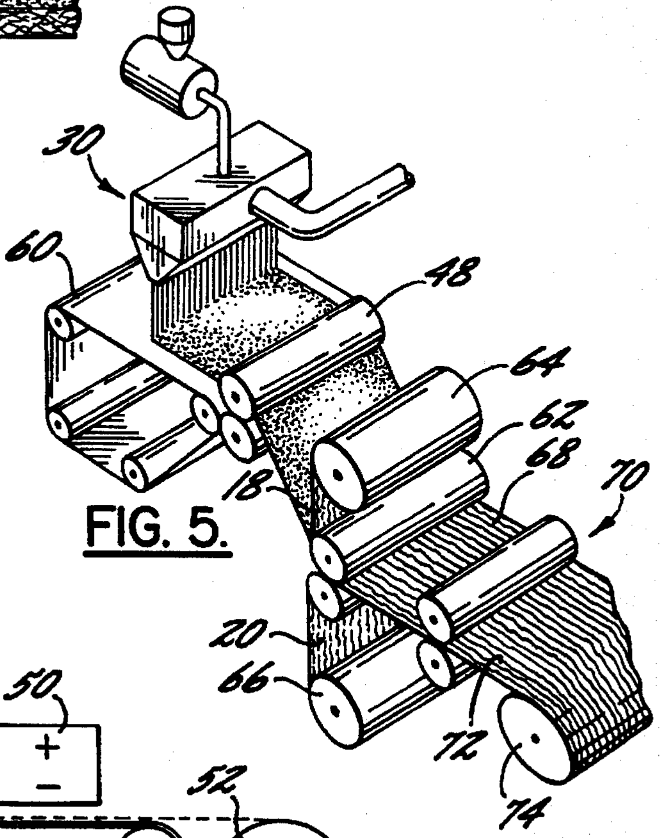
FIG. 5 is a perspective schematic view of an illustrative process in accordance with the present invention for manufacturing the face mask of FIG. 2.

Referring now to FIG. 5, the present invention also includes a process for forming a face mask which includes as a filtration media component thereof meltblown web 10 of the invention. As illustrated in FIG. 5, a meltblowing apparatus 30 as described above deposits meltblown fibers onto screen 60 to form a microfibrous web 10. The microfibrous web 10 is directed through consolidation rolls 48 and is fed to rolls 62 where it is combined with a pre-formed web 18 and preformed web 20, drawn from supply rolls 64 and 66, respectively, to form a laminate 68.

As described above, pre-formed webs 18 and 20 can be carded webs formed of staple length textile fibers, including bicomponent staple length textile fibers. Alternatively, webs 18 and 20 can be spunbonded webs of continuous filaments, or a wet-laid or air-laid web of staple fibers. While pre-formed webs 18 and 20 are shown, it will be appreciated that the webs could be formed in a continuous in-line process and combined with meltblown web 10. It will also be understood that additional webs could be combined with meltblown web 10, on one or both sides thereof.

The three-layer laminate 68 is conveyed longitudinally as shown in FIG. 5 to a conventional thermal fusion station 70 to provide a composite bonded nonwoven fabric 72. The fusion station is constructed in a conventional manner as known to the skilled artisan, and advantageously includes bonding rolls. Preferably, the layers are bonded to provide a plurality of thermal bonds distributed along the periphery of the mask 14. Because of the wide variety of polymers which can be used in the fabrics of the invention, bonding conditions, including the temperature and pressure of the bonding rolls, vary according to the particular polymers used, and are known in the art for differing polymers.

Although a thermal fusion station in the form of bonding rolls is illustrated in FIG. 5, other thermal treating stations such as ultrasonic, microwave or other RF treatment zones which are capable of bonding the fabric can be substituted for the bonding rolls of FIG. 5. Such conventional heating stations are known to those skilled in the art and are capable of effecting substantial thermal fusion of the nonwoven webs. In addition other bonding techniques known in the art can be used, such as by hydroentanglement of the fibers, needling, and the like. It is also possible to achieve bonding through the use of an appropriate bonding agent as known in the art.

The resultant fabric 72 exits the thermal fusion station and is wound up by conventional means on a roll 74.

The present invention will be further illustrated by the following non-limiting example.

EXAMPLE

Meltblown webs were formed by meltblowing polypropylene resins having a melt flow rate of about 1250. The resin was meltblown at varying temperatures and air velocity speeds. The webs were electret treated using an apparatus of the University of Tennessee, which can result in a fabric which can maintain the electric charge for a long period of time and maintain the charge to a large degree after the fabric is sterilized, for example using steam and/or gamma sterilization. The drop in pressure across the web (Delta P) as well as filtration efficiency was measured for each web. The results are set forth below in Table 1.

TABLE 1

| Trial # | gsm | Diameter, μ | Air Perm cfm | ΔP | % BFE* |
|---|---|---|---|---|---|
| 1 | 1.0 | 0.8 | 331 | 0.3 | 99.2 |
| 2 | 3.0 | 1.1 | 174 | 0.7 | 99.5 |
| 3 | 5.0 | 1.3 | 144 | 0.8 | 99.9 |
| 4 | 20.0 | 1.7 | 54 | 2.0 | 99.9 |
| 5 | 42.0 | 2.7 | 57 | 2.1 | 90.4 |

*electret treated

The filtration efficiency of each web was tested using a standard BFE (a bacteria filtration efficiency) test, Nelson Labs Test # AB010. *Staphylococcus aureus* was nebulized into a spray mist and forced through an aperture in a closed conduit. The bacteria passing through the aperture were captured on agar plates held in an Andersen sampler. The same procedure was repeated with samples of the meltblown webs blocking the aperture of the conduit. After a period of at least 18 hours, the bacteria colonies were counted. The efficiency of filtration was determined by comparing the colony count on the plates with and without the meltblown web samples. Results are expressed as a percentage which represents the reduction of the bacteria colonies when the meltblown webs were in place.

The drop in pressure in millimeters ("mm") of water across each of the fabric samples was also measured using a constant flow rate (85 liters per minute) of air through a 100 square centimeter area of the web. As set forth in Table 1, the meltblown webs of the invention exhibit a pressure differential from 0.3 to 0.8. Such a low differential in pressure across the webs provides excellent breathability, despite the ability of the webs to filter particles.

The foregoing examples are illustrative of the present invention, and are not to be construed as limiting thereof. The invention is defined by the following claims, with equivalents of the claims to be included therein.

That which is claimed:

1. A face mask for covering a portion of the face of a wearer of the mask, said face mask comprising:

an absorbent facing layer for contacting a portion of the face of a wearer of the mask;

a cover layer; and an inner filtration layer sandwiched between said cover layer and said absorbent layer, said filtration layer having a basis weight of less than ten grams per square meter and comprising a plurality of thermoplastic microfine fibers having an average fiber diameter of less than 1.5 microns which were melt blown from a polymer having a melt flow rate greater than about 1000 g/10 min.

2. The face mask according to claim 1, wherein said filtration layer comprises a plurality of thermoplastic microfine fibers having an average fiber diameter between about 0.5 and 1.5 microns.

3. The face mask according to claim 1, wherein said filtration layer comprises a plurality of thermoplastic microfine fibers having an average fiber diameter between about 0.8 and 1.3 microns.

4. The face mask according to claim 1, wherein said filtration layer has a basis weight between 1 and 5 grams per square meter.

5. The face mask according to claim 1, wherein said thermoplastic microfine fibers are formed from a polymer selected from the group consisting of polyolefins, polyesters, polyamides, and copolymers and blends thereof.

6. The face mask according to claim 1, further comprising means for removably attaching the mask to the face of the wearer.

7. The face mask according to claim 1, wherein said thermoplastic microfine fibers are formed of a polymer having a melt flow rate of greater than 1,200 g/10 min.

8. The face mask according to claim 1, wherein said thermoplastic polymer is polypropylene.

9. The face mask according to claim 1, wherein the change in pressure drop across said filtration layer is from 0.3 to 0.8.

10. The face mask according to claim 1, wherein said outer cover layer is a hydrophobic nonwoven web.

11. The face mask according to claim 1, wherein said absorbent layer is a hydrophilic nonwoven web.

12. The face mask according to claim 1, wherein said face mask comprises a plurality of discrete thermal bonds about the periphery thereof bonding the absorbent layer, the filtration layer and the cover layer to form a coherent laminate fabric.

13. A face mask for covering a portion of the face of a wearer of the mask, said face mask comprising:

an absorbent facing layer for contacting a portion of the face of a wearer of the mask;

a hydrophobic cover layer; and an inner filtration layer having a basis weight of 1 to 5 grams per square meter and comprising a plurality of microfine microfibers having an average fiber diameter of 0.5 to 1.5 microns formed from a polypropylene having a melt flow rate of greater than 1,000 g/10 min., said filtration layer exhibiting a pressure drop across said filtration layer from 0.3 to 0.8, said filtration layer sandwiched between and bonded to said cover layer and said absorbent layer to form a coherent face mask.

14. A process for the manufacture of a face mask for covering a portion of the face of a wearer of the mask, the process comprising:

forming from a polymer having a melt flow rate greater than about 1000 g/10 min. a meltblown web having a basis of weight of less than 10 grams per square meter and comprising a plurality of thermoplastic microfine meltblown fibers having an average fiber diameter of less than 1.5 microns;

sandwiching said meltblown nonwoven web between opposing nonwoven webs to form a laminate fabric; and bonding said opposing nonwoven webs and said meltblown web together to form a coherent laminate fabric.

15. The process according to claim 14, wherein the step of forming a meltblown web comprises forming a meltblown web comprising a plurality of thermoplastic microfine fibers having an average fiber diameter between 0.5 and 1.5 microns.

16. The process according to claim 14, wherein the step of forming a meltblown web comprises forming a meltblown web comprising a plurality of thermoplastic microfine fibers having an average fiber diameter between 0.8 and 1.3 microns.

17. The process according to claim 14, wherein the step of forming a meltblown web comprises forming a meltblown web having a basis weight between 1 and 5 grams per square meter.

18. The process according to claim 14, wherein the step of forming a meltblown nonwoven web comprises forming a meltblown nonwoven web formed of a polymer selected from the group consisting of polyolefins, polyesters, polyamides, and blends and copolymers thereof.

19. The process according to claim 14, wherein the step of forming a meltblown nonwoven web comprises forming a meltblown web from a polymer having a melt flow rate of greater than 1,200 g/10 min.

20. The process according to claim 14, wherein the step of forming a meltblown web comprises forming a meltblown web having a pressure drop across said meltblown web from 0.3 to 0.8.

21. The process according to claim 14, wherein the step of bonding said laminate fabric comprises thermally bonding said laminate fabric.

22. The process according to claim 14, wherein the step of sandwiching said meltblown layer between outer opposing layers comprises sandwiching said meltblown layer between a hydrophobic cover layer and a hydrophilic absorbent layer.

23. A process for manufacturing a meltblown barrier layer, comprising:

extruding a molten thermoplastic polymer, having a melt flow rate greater than about 1000 g/10 min. through capillaries to form filamentary streams;

attenuating and breaking said filamentary streams with a high velocity heated gas to form a plurality of microfine fibers having an average fiber diameter of less than 1.5 microns; and collecting said microfine fibers on a collection surface to form a nonwoven web having a basis weight of less than 10 grams per square meter.

24. The process according to claim 23, wherein said molten thermoplastic polymer is polypropylene and said high velocity heated gas is heated to a temperature from 560° F. to 650° F.

25. The process according to claim 24, wherein said high velocity heated gas is heated to a temperature of between 575° F. and 640° F.

26. The process according to claim 24, wherein said high velocity heated gas has an air velocity of about 25 to 30 cubic feet per minute per inch.

27. The process according to claim 23, wherein said molten polymer has a melt flow rate of greater than 1,200 g/10 min.

28. The process according to claim 23, wherein said microfine fibers have an average fiber diameter between 0.5 and 1.5 microns.

29. The process according to claim 23, wherein said meltblown web has a basis weight between 1 and 5 grams per square meter.

* * * * *